No. 672,311. Patented Apr. 16, 1901.
S. W. COMBS.
THEATRICAL DEVICE.
(Application filed June 16, 1900.)
(No Model.) 2 Sheets—Sheet 1.
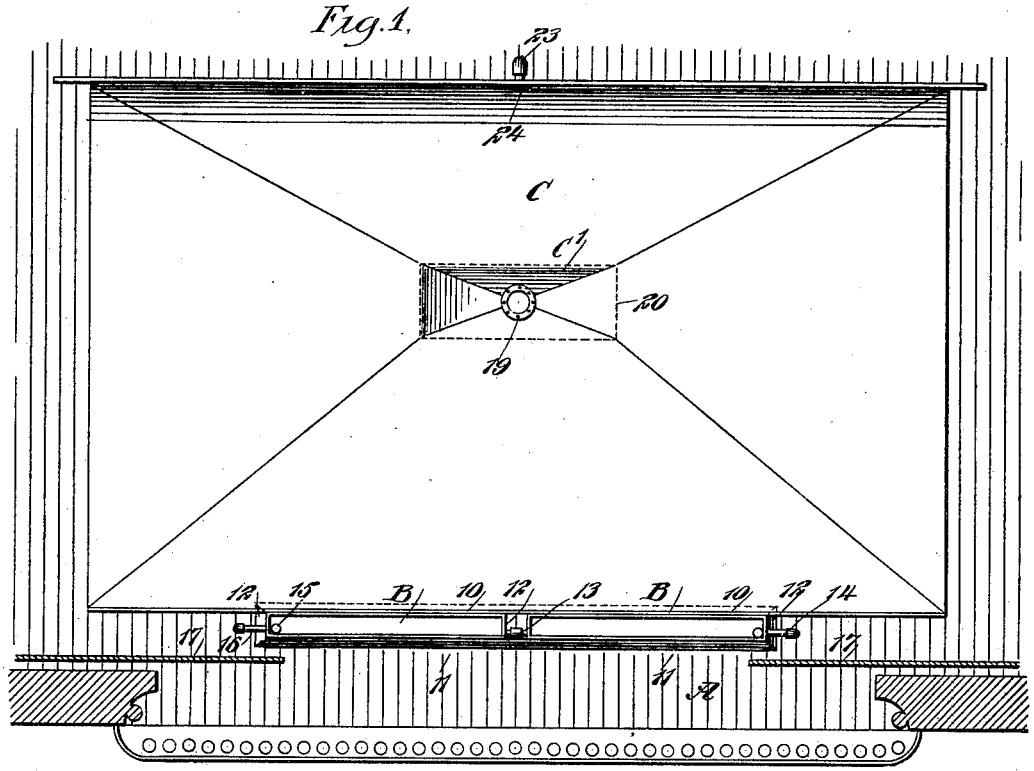
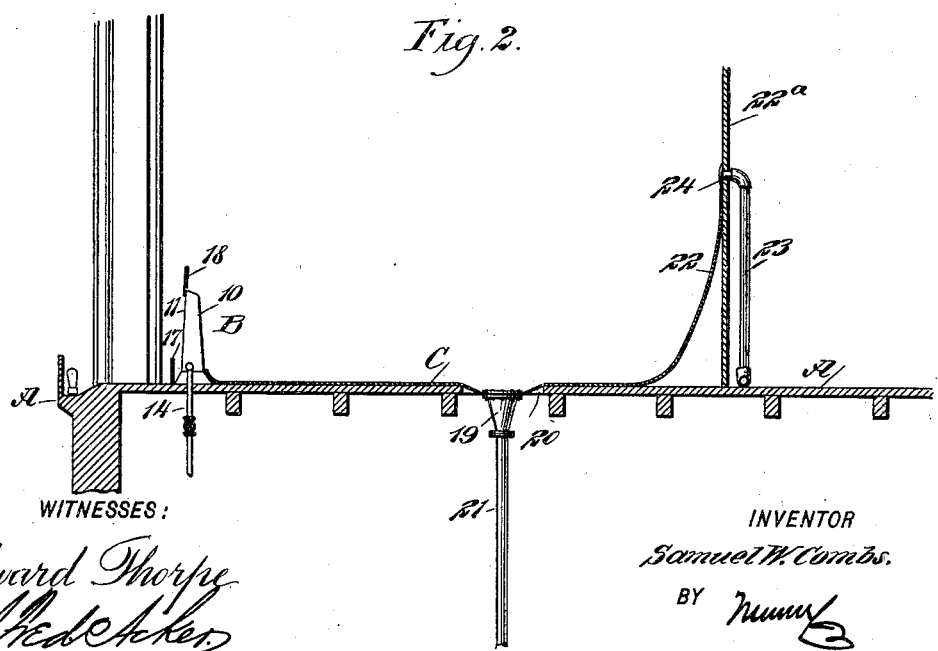
WITNESSES:
Edward Thorpe
INVENTOR
Samuel W. Combs.
BY
ATTORNEYS No. 672,311. Patented Apr. 16, 1901.
S. W. COMBS.
THEATRICAL DEVICE.
(Application filed June 16, 1900.)
(No Model.) 2 Sheets—Sheet 2.
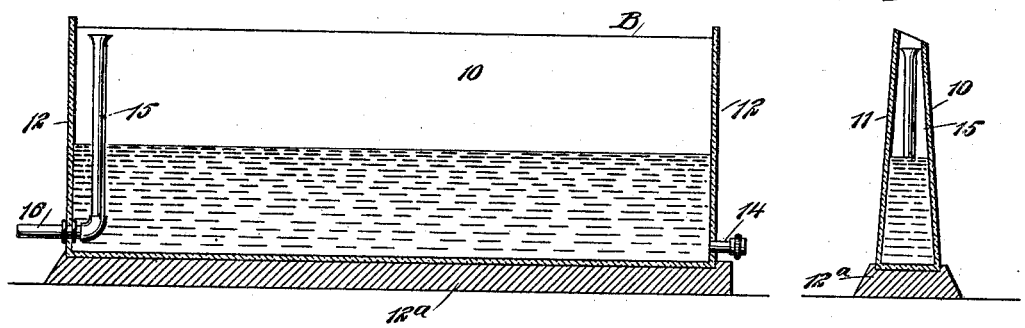
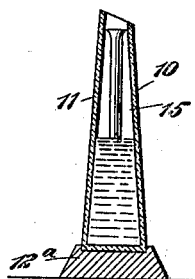
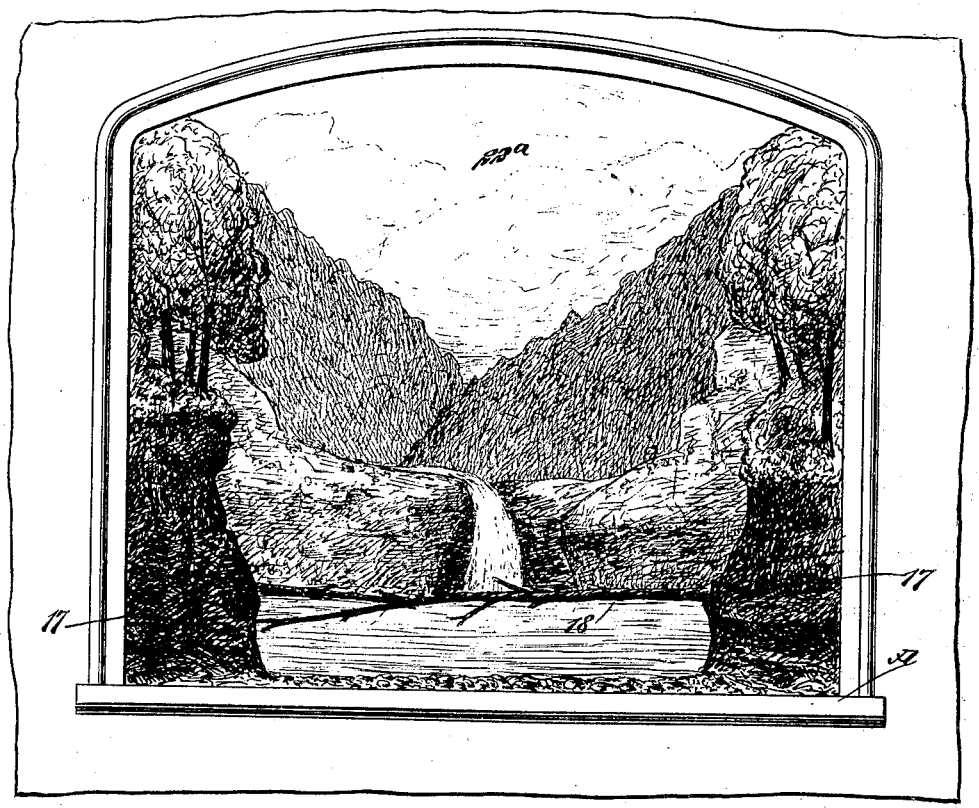
WITNESSES:
Edward Thorpe
INVENTOR
Samuel W. Combs.
BY
ATTORNEYS

UNITED STATES PATENT OFFICE.

SAMUEL W. COMBS, OF NEW YORK, N. Y., ASSIGNOR OF ONE-HALF TO HENRY B. WARNER, OF SAME PLACE.

THEATRICAL DEVICE.

SPECIFICATION forming part of Letters Patent No. 672,311, dated April 16, 1901.

Application filed June 16, 1900. Serial No. 20,583. (No model.)

*To all whom it may concern:*

Be it known that I, SAMUEL W. COMBS, a citizen of the United States, and a resident of the city of New York, borough of Manhattan, in the county and State of New York, have invented a new and Improved Device for Producing Stage Effects, of which the following is a full, clear, and exact description.

The purpose of the invention is to provide a stage effect in which water apparently rises gradually to a certain level on the stage, but without the water wetting the stage or in any manner interfering with the setting of a subsequent scene.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of a stage set in accordance with my invention. Fig. 2 is a vertical section through the stage and the improved device applied to the stage. Fig. 3 is an enlarged longitudinal vertical sectional view of one of the tanks employed in producing the stage effect. Fig. 4 is a transverse vertical section through the tank shown in Fig. 3, and Fig. 5 is a view of the stage effect from the front of the stage.

In carrying out this invention I employ a tank or tanks made wholly or in part of glass and operated in conjunction with a tarpaulin or waterproof cloth placed upon the stage to produce the illusion to the audience that the stage is being gradually covered with water or other liquid to a desired depth. These tanks are so placed upon the stage that the sides toward the audience, being transparent, do not appear to exist, their horizon-lines being properly concealed by stage fittings or settings of any description, and any action that may take place behind the tanks will be quite apparent from the front. These tanks have connections through which water flows into them in such manner that the water appears to be rising to the same height all over the level of the stage.

In the further carrying out of the invention a tarpaulin or waterproof cloth, as stated, is spread all over the stage and is provided with a depressed or narrowing pocket, which pocket and an added connection are carried through a trap in the stage. The cloth or tarpaulin extends upward from the stage at the back, so as to safely catch the flow of water from the outlet or outlets in the stage-setting at such points, and the water thus admitted is made to flow upon the cloth or tarpaulin either from the back or the side of the stage or at any point at the rear of the tanks, which flow of water finds an exit at the trap. This flow of water leads the audience to believe it is that which is flooding the stage and it is that water which is rising in the tanks which they see from the front of the stage.

A represents a stage, and at the front portion of this stage one or more tanks B are placed longitudinally of the stage in full view of the audience at the front. These tanks are made wholly or partially of glass. Usually, however, their rear and their front sides 10 and 11 are of glass, while the ends 12 are of metal or of wood, as is likewise the bottom $12^a$. When two tanks are employed, as shown in Fig. 1, they are placed end to end and may be connected by a suitable coupling 13, which coupling is masked or concealed by a suitable piece of scenery placed in such position as to hide the coupling, and the end portions of the tanks are concealed by wings 17 or side sections of scenery, as shown in Figs. 1 and 5.

In the construction of the tanks B the fronts 11 of the tanks are preferably made higher than the back portions 10, so that in the event of any overflow the water or liquid will pass to the rear of the tank upon the stage and not at the front of the tanks, and thus interfere with the illusion. The tanks are quite narrow from front to rear and are preferably narrower at the top than at the bottom. Each tank is provided with an inlet 14, usually located at one end, and at the opposite end of the tank an overflow 15 is placed, which overflow is connected with a suitable discharge-pipe 16. As heretofore stated, the end portions of the tanks are masked in any suitable or approved manner, so that the inlets and overflows are not visible.

In order to break or conceal the horizon-line of the tanks B, a bough 18 or any proper piece of scenery is laid along the upper edge of the tank or tanks at the front, so that the audience will see only a transparent surface, and the base 12ª of the several tanks or of the single tank, if only one be employed, is likewise concealed by suitably-arranged scenery, as shown in Fig. 5.

A tarpaulin or a waterproof cloth C, of any suitable description, is laid upon the stage, as shown in Figs. 1 and 2, which cloth or tarpaulin extends up along the rear portion of the base of the tank or tanks, as is also shown in Fig. 2, and the tarpaulin is preferably so placed that it inclines from its sides and ends toward a central depressed portion C', (shown in Fig. 1,) at which central depressed portion a coupling 19 is located, adapted to receive water deposited upon the tarpaulin or cloth, and this coupling extends down through a trap or opening 20 in the stage, as shown in Fig. 2, and is connected with an offtake-pipe 21, as is also shown in the same figure. The tarpaulin or waterproof cloth C is carried upward at the rear of the stage to an engagement with a set scene 22ª or the like, and a water-supply pipe 23 is carried up at the rear of the back scene 22ª and to the front of the said scene above the upward stretch 22 of the tarpaulin, as shown at 24 in Fig. 2, so that the water from the pipe 23 will flow upon the upward stretch of the tarpaulin and pass to the level of the stage and out through the coupling 19 and offtake-pipe 21. This water-inlet pipe is carried to such a height that the water delivered therefrom will be visible from the front of the stage. I desire it to be understood that this water-delivery pipe 23 may be placed at one side of the stage, if so desired, in which event the upward stretch 22 of the tarpaulin will be located at such point on the stage; but preferably the water-inlet pipe 23 is placed, as shown, at the rear of the stage, and the water flowing from this pipe may be made to follow an apparent course indicated upon the rear set scene 22ª.

Under this construction of stage-setting it is obvious that the illusion from in front of the stage is to the effect that water gradually rises over the entire area of the stage, since the water is turned on gradually at the inlet-pipes 14 on the stage and rises in the tanks to the level of the overflows 15 in a gradual manner, and the stream of water from the inlet-pipe 23 being clearly visible to the audience leads them to believe that the water which is gradually rising in the line of vision is that which is supplied from the said stream of water. It is also evident that the tarpaulin, through the medium of the exit connections 19 and 21, conducts from the stage all the water that is thrown upon the stage through the medium of the inlet-pipe 23, and it is also evident that such water may be conducted from the stage as rapidly as delivered thereto, leaving the front portion of the stage at the rear of the tank or tanks B perfectly dry. It also will be understood that the position of the tanks may be changed as found desirable in carrying out the illusion.

Having thus described my invention, I claim as new and desire to secure by Letters Patent—

1. A theatrical illusion consisting of a background, a tank located at or near the front of the stage, and having transparent front and rear walls, said tank extending the entire distance between the side scenes of the stage, and being narrow from front to rear, and a water-supply for the said tank, substantially as described.

2. A device for producing stage effects, having a tank with transparent front and back walls, means for supplying liquid at the bottom portion of the tank, an overflow located within the tank, and masking-scenes for the supply and overflow devices and the horizon-line of the tank.

3. In a theatrical illusion, a tank having transparent front and rear walls and located at or near the front of the stage the said tank extending the entire distance between the side scenes of the stage, the front and rear walls of the tank converging toward their upper edges and the back wall being lower than the front wall, and a water-supply for said tank, substantially as set forth.

4. A device for producing stage effects, having a tank with transparent back and front walls, which tank is adapted to be placed in front of a performer, a water supply and overflow for the tank, masking-scenes to conceal the water-supply, overflow and horizon-line of the tank, and a second source of water-supply located back of the said tank and visible to the audience, as described.

5. A device for producing stage effects, having a tank with transparent back and front walls, which tank is adapted to be placed in front of a performer or performers, a water supply and overflow for the tank, masking-scenes for concealing the water-supply, overflow, and the horizon-line of the tank, a second source of water-supply located back of the said tank and visible to the audience, and a waterproof covering for the stage, having a water-outlet, which outlet is located between the tank and water-supply at the rear of said tank, as specified.

6. A device for producing stage effects, comprising a tank having transparent front and back walls and arranged at or near the front of a stage, and means whereby the outlines of the tank are rendered invisible to the audience, as set forth.

7. In a device for producing stage effects, a tank narrow from front to rear and having transparent front and rear walls, the said tank being arranged at or near the front of the stage, means for gradually supplying the tank with liquid, means for concealing the outlines of the tank and the water-supply when viewed from the front, and a visible water-supply at the rear of the tank, as specified.

8. A stage having a background, a tank having a water-supply and located in front of said background, the said tank having transparent front and rear walls, a floor-space for the players between the said tank and background, and masking-scenes for concealing the outlines of the tank and the water-supply whereby the tank is rendered invisible to an audience in front of the same.

9. A stage having a tank with transparent front and back walls, a water connection for said tank, means substantially as described for concealing the outlines of the tank and the water connection, from in front of the stage, scenery behind and distant from the tank, a water-supply in connection with said scenery at a point higher than the tank, and a waterproof covering for the stage arranged to receive the flow of water from the water-supply connected with said scenery, the said waterproof covering having a water-outlet, as set forth.

10. In a device for producing stage effects, a tank having transparent front and rear walls, the tank being narrow from front to rear, and the rear wall of said tank being lower than the front wall, for the purpose set forth.

In testimony whereof I have signed my name to this specification in the presence of two subscribing witnesses.

SAMUEL W. COMBS.

Witnesses:
J. FRED. ACKER,
H. B. WARNER.